(12) United States Patent
Williams

(10) Patent No.: US 11,313,437 B1
(45) Date of Patent: Apr. 26, 2022

(54) DUAL-SIDED RATCHET STRAP APPARATUS

(71) Applicant: George Frederic Williams, New Castle, DE (US)

(72) Inventor: George Frederic Williams, New Castle, DE (US)

(*) Notice: Subject to any disclaimer, the term of this patent is extended or adjusted under 35 U.S.C. 154(b) by 0 days.

(21) Appl. No.: 17/392,417

(22) Filed: Aug. 3, 2021

(51) Int. Cl.
*F16G 11/00* (2006.01)
*F16G 11/12* (2006.01)
*B60P 7/08* (2006.01)
*F16G 11/04* (2006.01)

(52) U.S. Cl.
CPC .............. *F16G 11/12* (2013.01); *B60P 7/083* (2013.01); *F16G 11/048* (2013.01)

(58) Field of Classification Search
CPC ........... B60P 7/083; Y10T 24/21; F16G 11/12
See application file for complete search history.

(56) References Cited

U.S. PATENT DOCUMENTS

| | | | | |
|---|---|---|---|---|
| 3,099,055 | A * | 7/1963 | Huber | B61D 45/00 410/103 |
| 6,139,234 | A * | 10/2000 | Huang | B60P 7/083 410/100 |
| 6,457,701 | B1 * | 10/2002 | Huang | A44B 11/125 24/68 CD |
| 2010/0205790 | A1 * | 8/2010 | Chen | B60P 7/083 24/68 CD |
| 2018/0141479 | A1 * | 5/2018 | Anderson | B60P 7/083 |

* cited by examiner

*Primary Examiner* — Emmanuel M Marcelo
(74) *Attorney, Agent, or Firm* — Devlin Law Firm LLC

(57) ABSTRACT

A dual-sided ratchet strap apparatus has a strap cam configured on the ratchet base configured to lock a cam strap against a cam lock interface to secure the cam strap in position. The dual-sided ratchet strap apparatus has the cam strap extension, extending in a first direction from the ratchet buckle and a ratchet strap extension, extending in an opposing direction from the ratchet buckle. The ratchet buckle is actuated by the ratchet handle that can be rotated about the ratchet shaft. The strap cam is self-locking wherein tension from the extended end of the strap cam pulls the cam surface into engagement with the cam lock interface. The cam strap can however be pulled out of the cam interface toward the ratchet buckle to enable quick and easy positioning of the ratchet. The cam handle may be configured to rotate in a ratchet base aperture.

19 Claims, 5 Drawing Sheets

DUAL-SIDED RATCHET STRAP APPARATUS

BACKGROUND OF THE INVENTION

Field of the Invention

The invention relates a dual-sided ratchet strap apparatus having a strap cam configured on the ratchet base and configured to lock the cam strap extension against a cam lock interface to secure the cam strap extension in position for tightening of the cam strap by a ratchet handle.

Background

Ratchet straps are used to secure loads in place and in particular loads that are being transported. Often times these loads are configured in a truck or trailer. Ratchet straps typically have a hook coupled to a short fixed length strap and then a ratchet strap that extends from the ratchet buckle having another hook on the extended end. The short fixed length strap is coupled to a support, such as to a ring along the bottom of the truck bed, or along the base of the trailer. This ratchet strap is extended over the load to a ring or support on the opposing side of the truck bed or trailer. This arrangement configures the ratchet in a position that is often times difficult to reach and even harder to manipulate. The loads often extend up vertically and are configured close to the rail of the trailer or sides of a truck bed. This leaves little room to couple the hook of the short fixed length strap and makes it very difficult to manipulate the ratchet while reaching down over the side of the truck bed. Some ratchets are configured with an adjustable strap extending from either end, but require difficult manipulation of a buckle to change the length of the strap.

SUMMARY OF THE INVENTION

The invention is directed to a dual-sided ratchet strap apparatus having a strap cam configured on the ratchet base and configured to lock a cam strap against a cam lock interface to secure the cam strap in position. The dual-sided ratchet strap apparatus has the cam strap extension, cam strap as used herein, extending in a first direction from the ratchet buckle and a ratchet strap extension, a ratchet strap as used herein, extending in an opposing direction. The cam strap and ratchet strap may be a continuous strap that extends through the ratchet buckle, or may be separate straps each being coupled to the ratchet buckle. The ratchet buckle is actuated by the ratchet handle that can be rotated about the ratchet shaft. The cam strap extends from a coupled end, secured to the ratchet shaft, such as a split take-up shaft, along the ratchet base and through a cam opening to an extended end that may be coupled with a cam strap coupler, such as a hook. The ratchet strap extends from a coupled end, again coupled with the ratchet shaft to an extended end that may be coupled with a ratchet strap coupler, such as a hook.

The ratchet handle extends from a coupled end coupled with both the ratchet base and the ratchet buckle about a ratchet shaft, to an extended end. The ratchet handle is configured to rotated about the ratchet shaft to index the ratchet buckle, ratchet teeth and rotate the ratchet shaft. A plurality of ratchet teeth extend from the ratchet shaft and a ratchet dog, coupled to the ratchet handle, is configured to engage with the ratchet teeth to index or turn the ratchet buckle and ratchet shaft upon ratcheting of the ratchet handle forward. The ratchet dog may be a pin that is forced toward the ratchet teeth by a ratchet dog spring. When the ratchet handle is ratcheted backward, the ratchet dog slips over the ratchet teeth and a retainer dog prevents the ratchet shaft from spinning backward due to tension on the ratchet strap and/or the cam strap. Again, the retainer dog is pushed toward the ratchet teeth by a retainer dog spring.

A tension release lobe is configured on the coupled end of the ratchet handle and when the ratchet handle is rotated forward far enough, the tension release lobe forces the retain dog out and away from the ratchet teeth to release the ratchet shaft and allow the ratchet strap and cam strap to be released. This enables the ratchet buckle to freely spin and the ratchet strap to be uncoiled from the ratchet buckle.

An exemplary strap cam is attached to the ratchet base with the cam handle extending substantially parallel with the length of the ratchet base, or toward the base handle-end, or orthogonal to the rotational axis of the ratchet shaft or cam rotational axis. The cam handle has a cam handle-end that may be configured more proximal to the ratchet base handle-end than the opposing cam end. The cam handle rotates about a cam pivot that may be secured to the ratchet base. The cam pivot may include a pin that is coupled with the ratchet base. A cam spring may force the cam handle into an engaged position with the cam surface engaged with the cam lock interface. A cam spring may be a torsional spring that extends around the cam pivot, for example. The cam end may be configured with a textured surface on the cam surface, which may be a roughened surface, a knurled surface or a grooved surface, for example. A surface roughness of the cam surface may be about 50 micron Ra or more, about 100 micron Ra or more. The cam surface may be a curved surface to enable gradual compression of the cam strap in the cam opening, between the cam surface and the cam lock interface. The cam handle may be rotated about the cam pivot to cause the curved cam surface to rotate down into a locked configuration with a cam strap locked portion pinched in the cam opening by the cam surface and the cam lock interface. The cam lock interface may also be attached to the ratchet base and may have a textured surface, as described herein, to more effectively secure the cam strap in position.

A strap cam can be rotated about the cam pivot to an open configuration, wherein the cam surface is rotated up and away from the cam lock interface to expand the cam opening. In an open configuration, the cam strap can be pulled through the cam opening to produce a larger cam strap adjustable portion, or portion of the cam strap between the cam opening and the ratchet buckle. The cam strap may be pulled through the cam opening toward the ratchet buckle to adjust the position of the dual-sided ratchet strap apparatus before tightening the cam strap and the ratchet strap with the ratchet handle. An exemplary strap cam is self-locking, wherein tension applied on the cam strap from the cam strap extended end will pull the cam strap locked portion further down into the cam opening and force the cam surface into an engaged and locked position. This geometry is similar to a self-locking brake assembly. The more tension is applied to the cam strap from the cam strap extended end, the tighter the engagement of the cam surface with the cam lock interface. However, tension on the cam strap in the cam strap adjustable portion, or toward the ratchet buckle, may allow the cam strap to be pulled out through the cam opening as it may rotate the cam handle to open the cam opening. The strap cam may therefore be a one-way locking strap cam that is easier to operate when additional cam strap adjustable portion is desired. For this one-way locking strap cam to function, the cam strap extends from an extended end, along a lock side of the cam handle and then through the cam opening to the ratchet buckle.

A cam pivot may comprise a pin or other extension that extends through the strap cam, such as through the cam handle, and is secured to the ratchet base. A cam spring, such as a torsional spring, may extend around the cam pivot and force the cam handle in an engaged position. The cam lock interface may also be coupled with the ratchet base. The strap cam or a portion thereof, and/or the cam lock interface may be configured at least partially in a ratchet base aperture, or opening in the ratchet base. The ratchet base aperture may form two opposing sides of the ratchet base and the strap cam and cam lock interface may extend across this ratchet base aperture. The cam handle configured in the ratchet base aperture provides a lower profile geometry and an ergonomic assembly for engaging and releasing the cam. With the cam handle configured to rotate within the ratchet base aperture, the cam is easy to manipulate when holding the ratchet base and is protected from impact and unwanted engagement by the ratchet base.

An exemplary dual-sided ratchet strap apparatus may be easily positioned in a desired position over a load and between supports. The ratchet handle may be rotated to release the ratchet buckle by engaging the tension release lobe with the retainer dog and the cam strap adjustable portion may be adjusted by pulling the cam strap through the cam opening toward the ratchet buckle. Also, the cam can be manually opened to allow the cam strap extension to be pulled through the cam opening to extend the length of the cam strap from the extended end to the cam opening. These three different ways of adjusting strap lengths make positioning of the dual-sided ratchet strap apparatus very easy.

Substantially parallel as used herein means within about 20 degrees of parallel and preferably within about 10 degrees of parallel and even more preferably within about 5 degrees of parallel.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
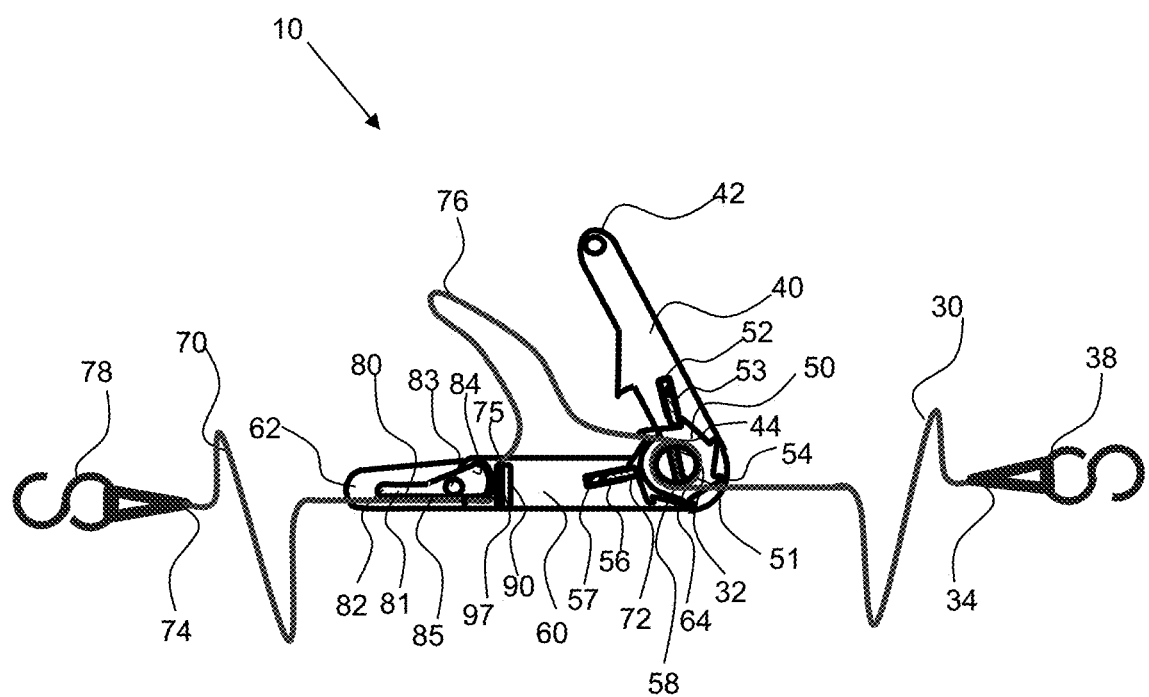
FIG. 1 shows a side cross sectional view of an exemplary dual-sided ratchet strap apparatus having a strap cam configured on the ratchet base and configured to lock the cam strap against a cam lock interface to secure the cam strap in position, wherein both the cam strap and a ratchet strap are attached to the ratchet buckle that is actuated by the ratchet handle extending therefrom.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be an included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Referring now to FIGS. 1 to 5, an exemplary dual-sided ratchet strap apparatus 10 has a strap cam 80 configured on the ratchet base 60 and configured to lock the cam strap 70 against a cam lock interface 90 to secure the cam strap in position, wherein both the cam strap 70 and a ratchet strap 30 are attached to the ratchet buckle 50 that is actuated by the ratchet handle 40 extending therefrom. The cam strap extends from a coupled end 72 to an extended end 74 that may be coupled with a cam strap coupler 78, such as a hook, and the ratchet strap 30 extends from a coupled end 32 to an extended end 34 that may be coupled with a ratchet strap coupler 38, such as a hook. Both the coupled end of the strap may be coupled to the ratchet shaft 51, which may be a split take-up shaft. The ratchet base 60 extends from the base handle end 62 to the base coupled end 64.

The ratchet handle extends from a coupled end 44, coupled with both the ratchet base and the ratchet buckle about a ratchet shaft 51, to an extended end 42. The ratchet handle is configured to rotate about the ratchet shaft to rotate the ratchet buckle and rotate the ratchet shaft. A plurality of ratchet teeth 54 extend from the ratchet shaft and a ratchet dog 52, coupled to the ratchet handle 40, is configured to engage with the ratchet teeth 54 to index or turn the ratchet buckle and ratchet shaft upon ratcheting of the ratchet handle forward, as indicated by the unfilled large arrow. The ratchet dog may be a pin that is forced toward the ratchet teeth by a ratchet dog spring 53. When the ratchet handle is ratchet backward, as indicated by the filled large arrow, the ratchet dog slips over the ratchet teeth and a retainer dog 56 prevents the ratchet shaft from spinning backward due to tension on the ratchet strap 30 and/or the cam strap 70. Again, the retainer dog is pushed toward the ratchet teeth by a retainer dog spring 57. A tension release lobe 58 is configured on the coupled end of the ratchet handle and when the ratchet handle is rotated forward far enough, the tension release lobe forces the retain dog out and away from the ratchet tooth 54' to release the ratchet shaft 51 and allow the ratchet strap and cam strap to be released.

Figure 3:
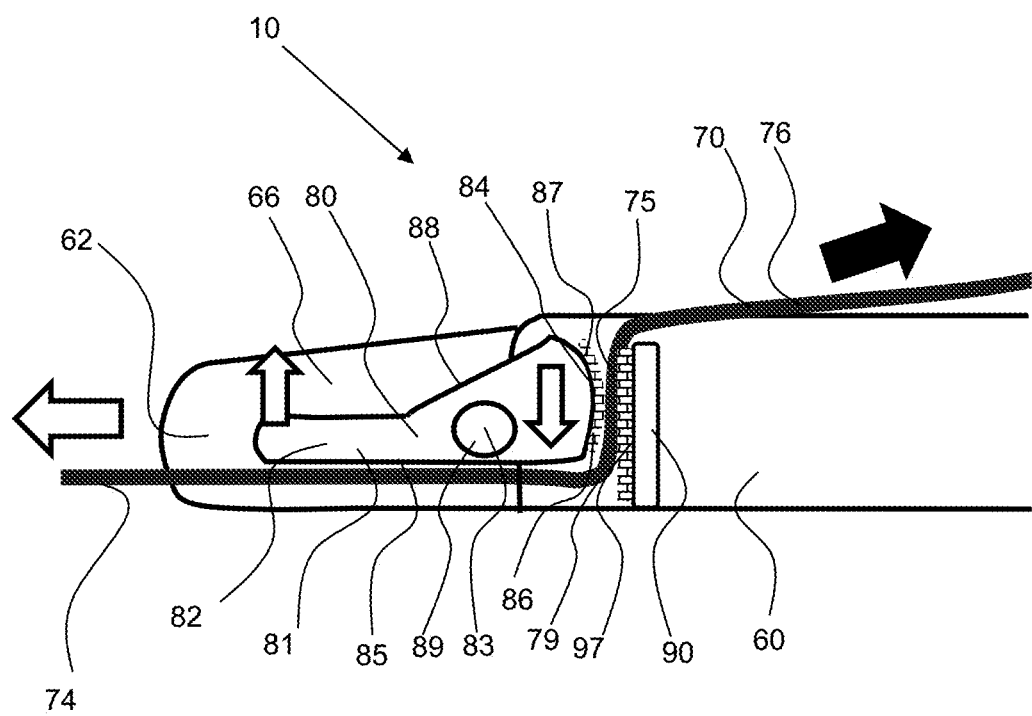
FIG. 3 shows an enlarged view of the exemplary strap cam configured proximal to the base handle-end and having a cam handle that extends toward the base handle-end and the cam strap secured between the cam surface and the textured surface of the cam lock interface.
Figure 4:
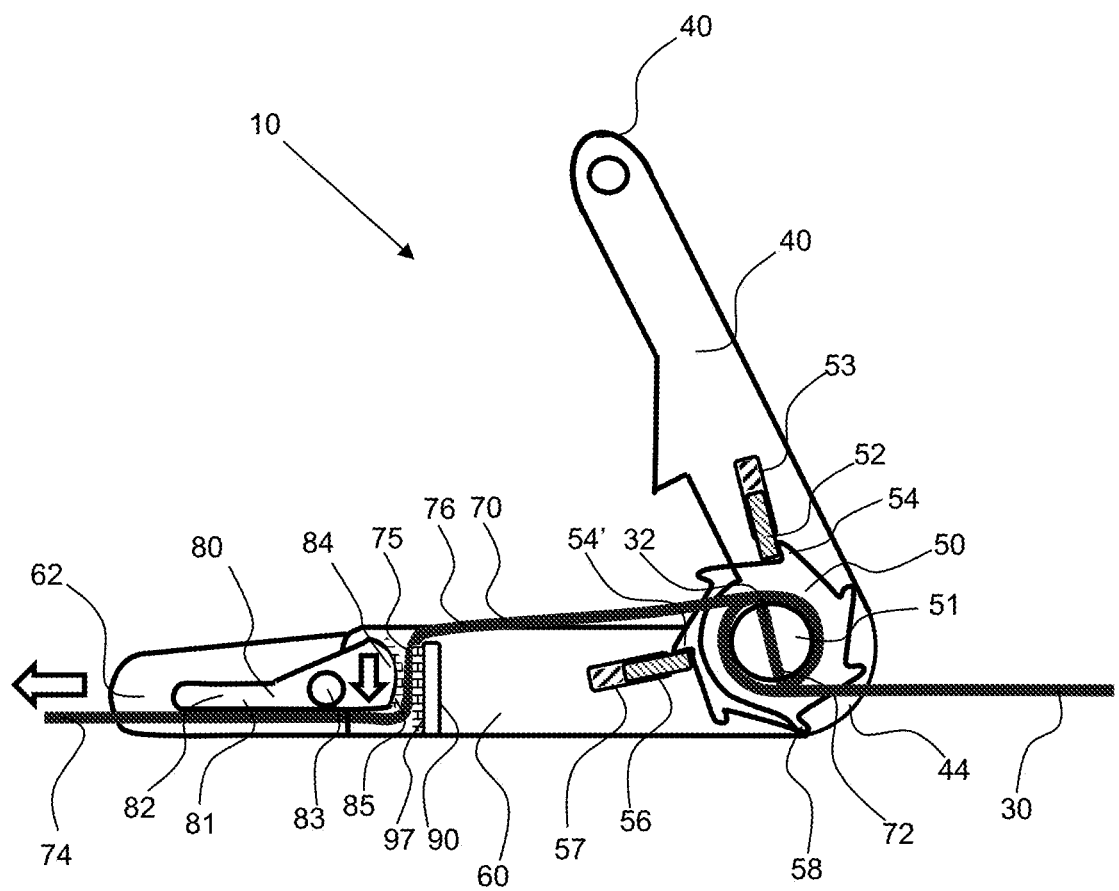
FIG. 4, shows an enlarged view of the exemplary dual-sided ratchet strap apparatus shown in FIG. 1, with the strap cam in a closed configuration with the cam surface rotated down toward the lock side of the strap cam to pinch the cam strap in the cam opening between the textured surface of the cam surface and the textured surface of the cam lock interface.
Figure 5:
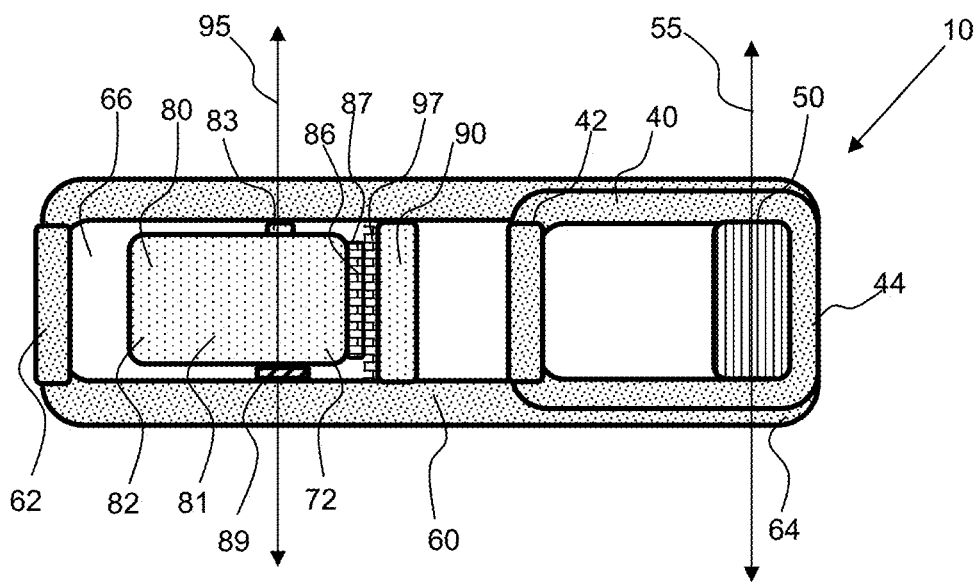
FIG. 5 shows a top view of an exemplary dual-sided ratchet strap apparatus having the strap cam attached to the ratchet base by the cam pivot that extends through the strap cam and is secured on either end to the ratchet base.

An exemplary strap cam 80 is attached to the ratchet base 60 with the cam handle 81 extending parallel with the length of the ratchet base, or toward the base handle-end, also orthogonal to the rotational axis of the ratchet shaft. The cam handle has a cam handle-end 82 that may be configured more proximal to the ratchet base handle-end 62 than the opposing cam end 84. The cam handle rotates about a cam pivot 83 that may be secured to the ratchet base, as shown in FIG. 5. The cam pivot may include a pin that is coupled with the ratchet base 60. The cam end may be configured with a textured surface 87 on the cam surface 86, which may be a curved surface to enable gradual compression of the cam strap 70 in the cam opening 79, between the cam surface 86 and the cam lock interface 90. As shown in FIG. 3, the cam handle is pulled upward, as indicated by the large arrow over the cam handle-end 82, to cause the curved cam surface 86 to rotate down into a locked configuration with the cam strap locked portion 75 pinched in the cam opening 79 by the cam surface and the cam lock interface 90. The cam lock interface may also be attached to the ratchet base and may have a textured surface 97 to more effectively secure the cam strap in position.

Figure 2:
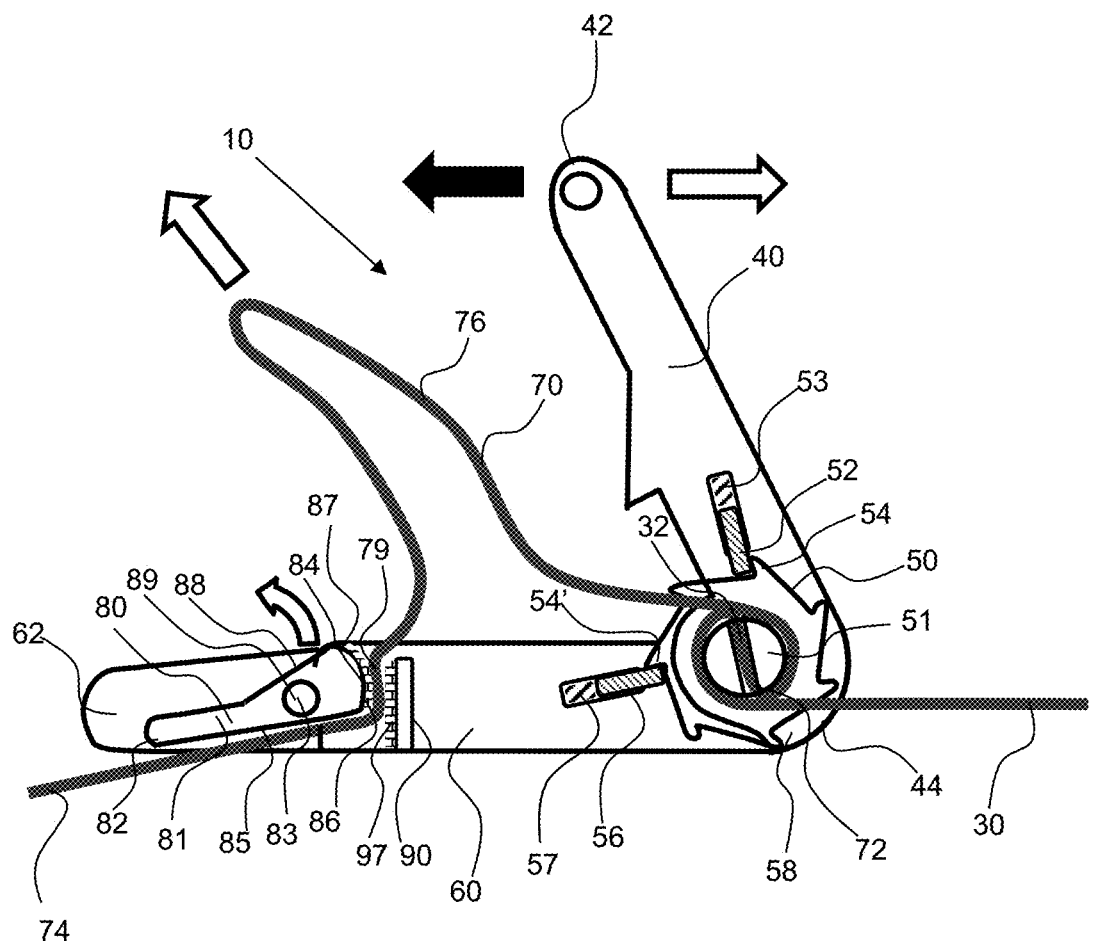
FIG. 2, shows an enlarged view of the exemplary dual-sided ratchet strap apparatus shown in FIG. 1, with the strap cam in an open configuration with the cam surface rotated up toward the release side of the strap cam to enable the cam strap to slide through the cam opening between the cam surface and the cam lock interface. This type of operation, may be used to relocate the ratchet strap apparatus to a more effective location for operation of the ratchet, or to center the ratchet strap over an object to be restrained.

As shown in FIG. 2, the strap cam 80 can be rotated about the cam pivot 83 to an open configuration, wherein the cam surface 86 is rotated out and away from the cam lock interface 90 to expand the cam opening 79. The cam strap 70 can now be pulled up through the cam opening to produce a larger cam strap adjustable portion 76, or portion of the cam strap between the cam opening and the ratchet buckle. This cam strap may be pulled as shown to adjust the position of the dual-sided ratchet strap apparatus before tightening the cam strap and the ratchet strap 30 with the ratchet handle 40.

As shown in FIG. 3, the strap cam is self-locking when tension is applied to the cam strap 70 from the extended end 74, as indicated by the large arrow pointing out from the base handle-end 62. The tension in the cam strap will pull the cam surface down and therefore tighten the cam surface pressure on the cam strap locked portion 75. However, tension on the cam strap in the cam strap adjustable portion, as indicated by the large dark arrow pointing along the cam trap adjustable portion 76, allows the cam strap to be pulled out through the cam opening, as it may rotate the cam handle 81 to open the cam opening, as shown in FIG. 2. The strap cam is therefore a one-way locking strap cam that is easier to operate when additional cam strap adjustable portion is desired. For this one-way locking strap cam to function, the cam strap extends from an extended end 74 and along a lock side 85 of the cam handle 81 and then through the cam opening 79 to the ratchet buckle 50. The lock side of the cam handle is the side that the cam surface is rotated toward to engage the cam surface with the cam lock interface. The release side 88 of the cam handle 81 is opposite the lock side 85. The cam handle 81 is configured to rotated with the ratchet base aperture 66, and is protected from unwanted locking or release by the sides of the ratchet base.

As shown in FIG. 5, the cam pivot 83 is coupled with the strap cam and may extend through the cam handle 81 and be secured to the ratchet base 60. The strap cam has a cam rotational axis 95 extending along the cam pivot and around which the cam handle rotates. The cam rotational axis 95 is substantially parallel with the ratchet rotational axis 55, the axis about which the ratchet buckle rotates. A cam spring 89, such as a torsional spring may be configured to force the cam into an engaged position with the cam surface 86 forced against the cam lock interface 90. The strap cam 80 or a portion thereof, and/or the cam lock interface 90 may be configured at least partially in a ratchet base aperture 66, or opening in the ratchet base. The ratchet base aperture forms two opposing sides of the ratchet base and the strap cam and cam lock interface extend across this ratchet base aperture. The cam lock interface 90 may also be coupled with the ratchet base. The strap cam or a portion thereof, and/or the cam lock interface may be configured at least partially in a ratchet base aperture 66, or opening in the ratchet base. As shown, the ratchet base aperture 66 forms two opposing sides of the ratchet base and the strap cam and cam lock interface extend across this ratchet base aperture 66. The cam handle 81 is configured to rotate within the ratchet base aperture and the cam lock interface is configured within the ratchet base aperture. The protects the cam from impact and from being locked or released when not desired, such as when holding the ratchet base, or manipulating the ratchet handle.

Figure 6:
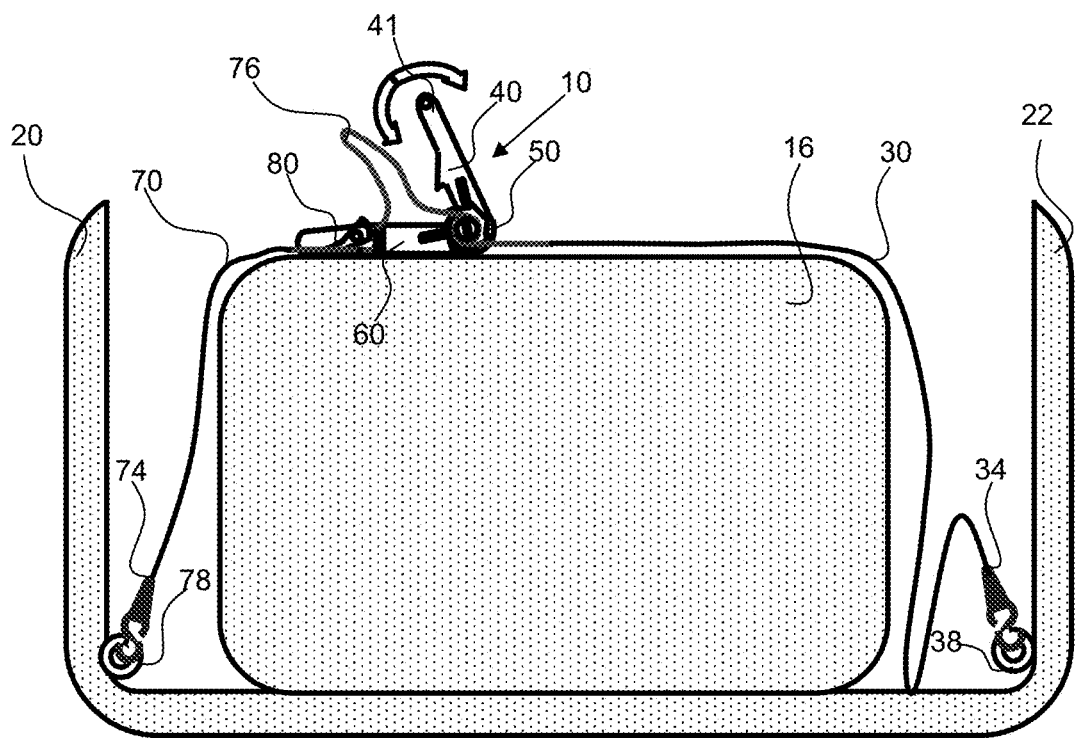
FIG. 6 shows an exemplary dual-sided ratchet strap apparatus configured over an object within a truck bed, with the strap cam in an open configuration and the cam strap loose and extending from the ratchet buckle through the cam opening and to a cam strap coupler coupled to a support and a ratchet strap extending from the ratchet buckle to the ratchet strap coupler that is coupled to a support on an opposing side of the package.
Figure 7:
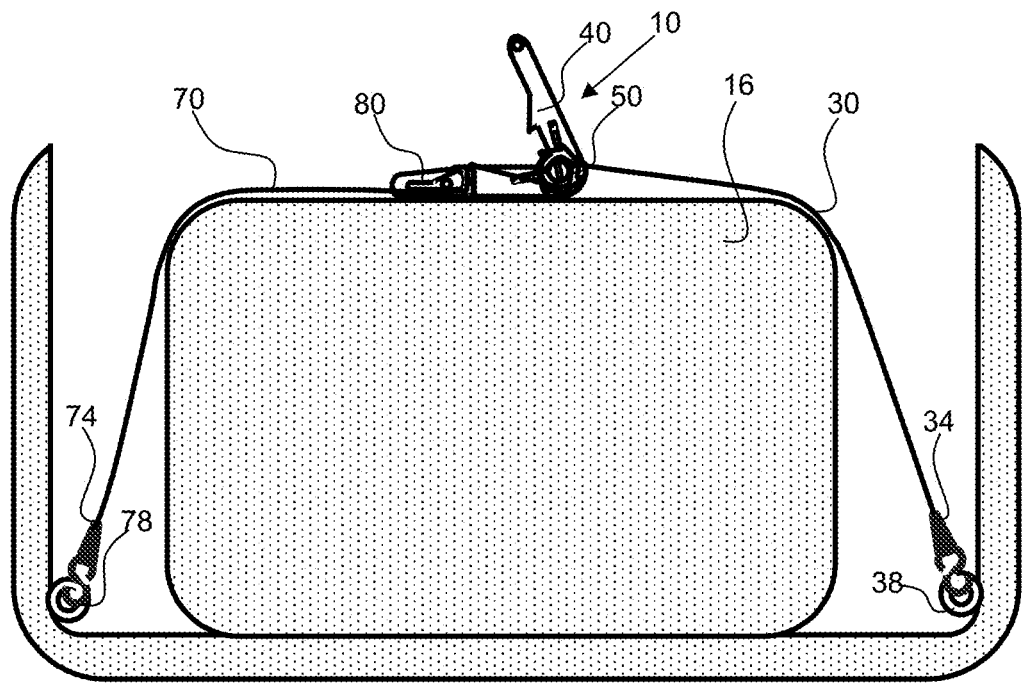
FIG. 7 shows the dual-sided ratchet strap apparatus of FIG. 6 with the strap cam now in a locked configuration and both the cam strap and the ratchet strap pulled tight, by operating the ratchet handle, as well as the cam strap adjustment portion to secure the object in place.

Referring now to FIG. 6, a dual-sided ratchet strap apparatus 10 is configured over an object 16 within a truck bed 20 having truck bed sides 22. The cam strap 70 is has the cam strap adjustable portion 76 extended to position the ratchet 41 over the object. This adjustment in cam strap length moves the ratchet from being positioned down in the truck bed between the truck bed side 22 and the object 16; a difficult position to operate the ratchet. The dual-sided ratchet strap apparatus 10 is configured with the strap cam 80 in an open configuration and the cam strap 70 loose and extending from the ratchet buckle 50 through the cam opening and to a cam strap coupler 78 coupling the cam strap extended end 74 to a support and a ratchet strap 30 extending from the ratchet buckle to a ratchet strap coupler 38 coupling the ratchet strap extended end 34 to a support. A length of the cam strap is pulled out through the cam opening to produce a cam strap adjustable portion 76 to adjust the position of the dual-sided ratchet strap apparatus 10 with respect to the object. As shown in FIG. 7, the dual-sided ratchet strap apparatus has been slid over, to be centered on the object; enabled by the cam strap adjustable portion 76. Also, as shown in FIG. 7, the strap cam 80 is now in a locked configuration and both the cam strap and the ratchet strap 30 have been tightened by the ratchet buckle 50 rotating to take up slack in both the cam strap and the ratchet strap.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A dual-sided ratchet strap apparatus comprising:
   a) a ratchet handle comprising:
      i) a ratchet handle-end;
      ii) a ratchet coupled-end;
   b) a ratchet base comprising:
      i) a base handle-end;
      ii) a base coupled-end
   c) a ratchet buckle coupled between the ratchet handle and the ratchet base and having ratchet teeth;
   d) a strap cam configured on the ratchet base and comprising:
      i) cam handle comprising:
         a cam handle end;
         a cam end having a cam surface;
      ii) a cam pivot coupled to the cam handle between the cam handle end and the cam end;
      iii) a cam lock interface having a cam side configured proximal to the cam surface of the strap cam;
   e) a ratchet strap comprising:
      i) a coupled portion;
      ii) an extended end; and
      iii) an extended length that extends from the ratchet buckle to said extended end of the ratchet strap;
   f) a cam strap comprising:
      i) a coupled portion;
      ii) an extended end; and
      iii) an extended length that extends from the ratchet buckle to said extended end of the cam strap;
      iv) a cam strap adjustable portion that has a length from the strap cam cam end to the coupled portion of the cam strap;
      wherein a length of the cam strap adjustable portion is adjustable.

2. The dual-sided ratchet strap apparatus of claim 1, wherein the cam handle of the strap cam is configured between base handle-end and the base coupled-end of the ratchet base.

3. The dual-sided ratchet strap apparatus of claim 2, wherein the cam handle-end of the strap cam handle is more proximal to the base handle-end of the ratchet base than the cam pivot.

4. The dual-sided ratchet strap apparatus of claim 1, wherein the cam lock interface is attached to the ratchet base.

5. The dual-sided ratchet strap apparatus of claim 1, wherein the ratchet base comprises a ratchet base aperture and wherein the cam pivot extends across said ratchet base aperture.

6. The dual-sided ratchet strap apparatus of claim 5, wherein the cam handle is configured to rotate within the ratchet base aperture.

7. The dual-sided ratchet strap apparatus of claim 6, wherein the cam lock interface is configured in the ratchet base aperture.

8. The dual-sided ratchet strap apparatus of claim 1, wherein the cam-end of the strap cam has a textured surface configured to prevent slipping of the cam strap through the strap cam.

9. The dual-sided ratchet strap apparatus of claim 1, wherein the cam side of the cam lock interface has a textured surface.

10. The dual-sided ratchet strap apparatus of claim 1, wherein cam strap is self-locking when tension is applied to the cam strap between the cam end of the strap cam and the extended end of the cam strap.

11. The dual-sided ratchet strap apparatus of claim 10, wherein the cam strap extends from the extended end, between the cam end of the cam handle and the cam lock interface from a lock side of the cam handle to a release side of the cam handle, and to the ratchet buckle.

12. The dual-sided ratchet strap apparatus of claim 1, wherein the cam strap and the ratchet strap are a continuous strap that is coupled to the ratchet buckle and extends from said extended end of the cam strap to said extended end of the ratchet strap.

13. The dual-sided ratchet strap apparatus of claim 1, wherein the strap cam further comprises a cam spring that forces the handle in rotation to engage the cam surface with the cam lock interface.

14. The dual-sided ratchet strap apparatus of claim 13, wherein the cam spring is a torsional spring configured around the cam pivot.

15. The dual-sided ratchet strap apparatus of claim 1, further comprising a ratchet dog that is coupled to the ratchet handle and is configured to engage with the ratchet teeth extending from the ratchet buckle.

16. The dual-sided ratchet strap apparatus of claim 15, further comprising a ratchet dog spring that is configured to force the ratchet dog into engagement with the ratchet teeth.

17. The dual-sided ratchet strap apparatus of claim 1, further comprising a retainer dog that is coupled to the ratchet base and is configured to engage with the ratchet teeth extending from the ratchet buckle.

18. The dual-sided ratchet strap apparatus of claim 17, further comprising a retainer dog spring that is configured to force the ratchet dog into engagement with the ratchet teeth.

19. The dual-sided ratchet strap apparatus of claim 17, further comprising a retainer release lobe that extends from the ratchet handle and is configured to engage with the retainer dog to release the ratchet buckle.

* * * * *